United States Patent [19]

Ishihara et al.

[11] Patent Number: 6,068,862
[45] Date of Patent: May 30, 2000

[54] TEA-DERIVED FEED ADDITIVE AND ANIMAL FEED CONTAINING THE SAME

[75] Inventors: Noriyuki Ishihara, Kuwana; Souichi Mamiya; Shigemitsu Akachi, both of Yokkaichi; Noriko Tsuji, Mie-gun; Senji Sakanaka, Yokkaichi; Izumi Ozeki, Suzuka; Ken Tsuda, Yokkaichi, all of Japan

[73] Assignee: Taiyo Kagaku Co., Ltd., Yokkaichi, Japan

[21] Appl. No.: 08/997,798

[22] Filed: Dec. 24, 1997

Related U.S. Application Data

[62] Continuation of application No. 08/698,292, Aug. 15, 1996, abandoned, which is a continuation of application No. 08/387,815, filed as application No. PCT/JP94/01037, Jun. 27, 1994, abandoned.

[30] Foreign Application Priority Data

Jun. 30, 1993 [JP] Japan ..................................... 5-189139
Sep. 3, 1993 [JP] Japan ..................................... 5-243865
Oct. 7, 1993 [JP] Japan ..................................... 5-277490

[51] Int. Cl.[7] .................................................. A01K 29/00
[52] U.S. Cl. ................................ 426/2; 426/635; 426/655
[58] Field of Search ................................ 426/2, 655, 635

[56] References Cited

U.S. PATENT DOCUMENTS

| | | | |
|---|---|---|---|
| 4,211,795 | 7/1980 | Leroy et al. ................................ | 426/2 |
| 4,377,569 | 3/1983 | Plymato ..................................... | 424/85 |
| 4,748,018 | 5/1988 | Stolle et al. ............................... | 424/87 |
| 5,071,653 | 12/1991 | Kakuda et al. ......................... | 424/195.1 |
| 5,112,964 | 5/1992 | Aoe et al. ................................. | 536/56 |
| 5,128,127 | 7/1992 | Beck ......................................... | 424/88 |
| 5,405,836 | 4/1995 | Richar et al. ............................. | 514/23 |

FOREIGN PATENT DOCUMENTS

5-000051  1/1993  Japan .

OTHER PUBLICATIONS

Abstract to Sakanaka et al. of JP 02182176 A2, Jun. 16, 1990, Jul. 1990.
Abstract of Sakanaka et al. of JP 01265023, Oct. 23, 1989.

*Primary Examiner*—Dwayne C. Jones
*Attorney, Agent, or Firm*—Oblon, Spivak, McClelland, Maier & Neustadt, P.C.

[57] ABSTRACT

The present invention relates to a feed additive for animals comprising tea extract, to a feed additive for animals of which active ingredient is tea leaf fiber, and to an animal feed comprising the feed additive for animals. The tea extract in the present invention exerts great effects in preventing and treating noninfectious and infectious diarrhea in domestic animals, poultry, and pet animals, improving milk quality of fresh milk, increasing milk yield, and improving reproductive efficiency. Also, the tea leaf fiber of the present invention improves intestinal function in domestic animals, decreases the occurrence of diarrhea, increases milk yield, improves feed efficiency and removes malodor of feces and urine.

3 Claims, No Drawings

TEA-DERIVED FEED ADDITIVE AND ANIMAL FEED CONTAINING THE SAME

This application is a continuation of application U.S. Ser. No. 08/698,292, filed on Aug. 15, 1996, which is a continuation of application U.S. Ser. No. 08/387,815, filed on Feb. 28, 1995 (abandoned), which was originally filed as International Application No. PCT/JP94/01037, filed Jun. 27, 1994.

TECHNICAL FIELD

The present invention relates to a tea-derived feed additive and an animal feed containing the additive. More specifically, the present invention relates to:

1) a tea extract-derived feed additive and an animal feed useful in preventing and treating noninfectious diarrhea associated with sudden environmental changes, feed composition changes, inappropriate breeding husbandry etc., or infectious diarrhea induced by pathogens, such as viruses or bacteria, in animals, such as domestic animals, poultry and pet animals, 2) a tea extract-derived feed additive and an animal feed useful in improving the quality and quantity of fresh milk produced by domestic animals, 3) a tea extract-derived feed additive and an animal feed useful in improving the reproductive efficiency for animals, such as domestic animals and poultry, and 4) a tea leaf-derived feed additive and an animal feed that improve intestinal function, decrease the occurrence of diarrhea, increase milk yield, improve feed efficiency and eliminate the malodor of feces and urine in animals, such as domestic animals and poultry.

BACKGROUND ART

In livestock farming, diarrhea of domestic animals and poultry has been a serious problem. For example, diarrhea and other digestive diseases that occur in cattle in the nursing and growth periods pose critical problems, the problems including not only death due to the diseases but also physical exhaustion and significant influence upon the normal growth of internal organs [Kazunori Hashimoto, The Beef Cattle Magazine, Vol. 5, No. 11, p. 38 (1988)]. In fact, in raising beef cattle, the incidence of digestive diseases with diarrhea as the major symptom in the nursing period is 13.3% [Toshio Nakane, Animal Husbandry, Vol. 33, No. 1, p. 37 (1979)]. Also, the rate of death and culling of dairy cows during the nursing and growth periods is 11.9%, the major causes being diarrhea and pneumonia [Hiroyuki Tojyo et al., Animal Husbandry, Vol. 40, No. 1, p. 51 (1986)]. Concerning adult cattle, diarrhea decreases feed efficiency, even if not lethal, resulting in decreased milk yield, milk quality and meat quality, which means considerable commercial loss.

The same applies to pigs and pet animals. It is common practice of breeding husbandry of these animals to grow babies apart from their dams from just after parturition. Such neonates are very low in antigenicity, easily permit pathogen growth because of the absence of intestinal bacterial flora, and are susceptible to various stresses. These factors interact with each other, causing diarrhea, which results in very high mortality and, if not lethal, significantly affects growth thereafter and causes poor development.

The same also applies to fowls. Diarrheal chicks are generally poor in development, showing body weight loss and increased body weight variation; these factors adversely affect productivity thereafter, resulting in decreased proportions of sale for production in broilers and decreased egg laying rates in egg laying hens. It is also known that antibody production capability after vaccination decreases.

Such diarrhea is caused by very complex factors. In addition to infectious diarrhea caused by toxins produced by pathogenic bacteria and diarrheal viruses, such as *Clostridium perfringens* type A, *Clostridium perfringens* type C, *Salmonella typhimurium*, *Salmonella dublin*, *Campylobacter jejuni*, *Campylobacter coli*, *Escherichia coli* 0-88, *Escherichia coli* 0-99, *Escherichia coli* 987P, *Staphylococcus aureus*, Rotavirus KK-3 and Rotavirus NCDV, or caused by intestinal bacterial floral changes due to infection with these bacteria and viruses, high incidence is reported of noninfectious diarrhea, e.g., diarrhea of unknown cause not associated with infectious microorganisms, such as stress diarrhea, which occurs due to stresses on domestic animals, poultry and pet animals.

These stresses on domestic animals, poultry and pet animals are known to be caused by three factors: environmental, nutritive and psychological changes. Specifically, there are various stress-causing factors, including over-crowding, lack of exercise, inappropriate livestock house sanitation due to lack of labor, feed composition changes due to parturition, and long-distance transportation during the weaning period.

In addition, it is appropriate to allow neonates to grow under protection by dams for a given period of time. For improving productivity or economy in livestock farming, however, it is now common practice of breeding husbandry to raise neonates apart from their dams from just after parturition, except for beef cattle. Most neonates isolated from their dams are gathered at nursing facilities etc. about 1 week after parturition, and grown collectively. In such period, neonates soon after birth are very low in antigenicity, easily permit pathogen growth because of the absence of intestinal bacterial flora, and are susceptible to various stresses. It is speculated that these factors interact with each other and easily cause diarrhea.

Traditionally, infectious diarrhea has been effectively prevented or treated by administering antibiotics to domestic animals, poultry and pet animals. However, this method is subject to limitation as to the kind and quantity of safely usable antibiotics, and has become doubtful as to efficacy in view of the occurrence of resistant bacteria ants safety. As a substitute for this method, various naturally-occurring antimicrobial substances have been used; for example, tea extract is shown to exhibit activity against infectious microorganisms or viruses (Japanese Patent Laid-Open Nos. 1-265023 and 2-276562). However, when tea extract is used alone or in combination with feed for infectious diarrhea, its effect is weak and doubtful for practical use. Also, when a specific antibody is used alone, because of the specificities of various kinds of pathogenic microorganisms, only therapeutic effect is obtained, with no preventive effect against diarrhea, so that the efficacy is not sufficient for practical use.

On the other hand, for preventing and treating noninfectious diarrhea, neonates are fed with sufficient colostrum from after parturition. Also, since stress on animals causes intestinal bacterial floral changes, such as increased susceptibility to infectious microorganisms, methods similar to those used for infectious diarrhea, or various probiotics or oligosaccharides are used. However, these methods are nothing more than nosotropic therapies. Also, probiotics and oligosaccharides have problems as to duration of efficacy. As for stress prevention, pigs are allowed to freely bite iron chains or old tires suspended in their pigsty or bedding straws placed in their pigsty daily to relieve pigs' boredom. However, these are passive prevention methods, and can apply to limited kinds of domestic animals, poultry and pet animals. Japanese Patent Examined Publication No. 3-17469 discloses a domestic animal acclimation composition for relieving stress, but it does not intend to suppress noninfectious diarrhea. The same applies to the method disclosed in Japanese Patent Examined Publication No. 3-70458, and that method is limited by rearing time and environment. In this situation, there is so far no feed additives or animal feeds containing them that effectively suppress the occurrence of noninfectious diarrhea in domestic animals, poultry and pet animals.

Also, the fresh milk produced by domestic animals is traded with ranking in terms of milk fat percentage, solids-not-fat percentage, cell count and milk protein percentage. For example, fresh milk of rank A is required to have a milk fat percentage of not less than 3.5%, a solid-not-fat percentage of not less than 8.5%, a cell count of not more than 300,000 and a milk protein percentage-of not less than 3.0%. Fresh milk outside these ranges cannot be traded in usual way, and fresh milk that fails to meet all these requirements should pay penalty. In other words, fresh milk qualified as rank A must has a certain levels of milk fat percentage, solid-not-fat percentage, cell count, and milk protein percentage. For these reasons, milk quality declining results in considerable economic loss for dairy farmers. Similarly, milk yield reduction leads to economic loss due to decreased productivity.

In this situation, there have been various attempts of improvement, which are mainly concerned with concentrates, to improve milk quality and increase milk yield (Japanese Patent Laid-Open Nos. 2-145154 and 2-286047).

However, countermeasures based on the above-described approach do not provide sufficient effect; there is need far measures for further improvement.

As for reproductive efficiency, when the quantity of milk produced by dairy cows is increased, inappropriate breeding husbandry can immediately cause infertility. This can cause infertility in a large number of cattle in a short period of time. However, there is now absolutely no therapeutic or prophylactic method effective against infertility [Toshihiko Nakao, Animal Husbandry, Vol. 44, No. 10, pp. 1143–1149 (1990)].

Domestic animals, such as dairy cows, beef cattle, pigs, and fowls, have recently been increasingly utilized, with a tendency to use concentrates, as described above, for improving productivity to increase economic efficiency. However, in comparison with conventional raw material type feed, concentrates give greater burden on the gastrointestinal organs, posing various problems, including decreased growth rate, decreased milk yield, and deterioration of meat quality in domestic animals.

Also, intensified breeding has increased the incidence of bacterial or viral diarrhea due to various factors, such as stress, as stated above; this situation poses industrially significant problems, including hampering of livestock house maintenance. Moreover, administration of antibiotics and potent antimicrobial agents against disease pose many problems, including disturbance of the digestive organs and intestinal bacterial flora in domestic animals, which can induce new disease. Another problem is anxiety regarding commercial value reduction and safety, due to persistence of these chemicals in milk and food meat.

On the other hand, fecal and urinary malodor generated from livestock houses significantly affect the environment. Diarrheal feces, in particular, are extremely malodorous, posing significant problems, such as malodor pollution. However, there is no effective solution to the improvement of such breeding environments.

DISCLOSURE OF INVENTION

In view of the above circumstances, the present inventors investigated (1) a feed additive and an animal feed effective against noninfectious and infectious diarrhea in domestic animals, poultry and pet animals, (2) a feed additive and an animal feed that improves the quality and quantity of fresh milk produced by domestic animals, (3) a feed additive and an animal feed that improves reproductive efficiency in animals, such as domestic animals and poultry, and (4) a feed additive and an animal feed that improves intestinal function, decreases the occurrence of diarrhea, increases milk yield, improves feed efficiency, and eliminates fecal and urinary malodor.

As a result, the present inventors discovered the following facts, and developed the present invention.

(1) Tannins, such as (+)-catechin, (+)-gallocatechin, (−)-gallocatechin gallate, (−)-epicatechin, (−)-epicatechin gallate, (−)-epigallocatechin, (−)-epigallocatechin gallate, free teaflavin, teaflavin monogallate A, teaflavin monogallate B and teaflavin digallate, all of which are polyphenol compounds contained in tea extract, are effective against noninfectious diarrhea, when used in feed; specific antibodies against pathogenic bacteria or viruses, or specific antibodies against toxins produced thereby, exhibit better effect against infectious diarrhea, when used in feed together with said polyphenol compounds, in comparison with said polyphenol compounds used alone.

(2) Said polyphenol compounds improve the quality and quantity of fresh milk produced by domestic animals, when used in feed.

(3) Said polyphenol compounds improve reproductive efficiency in animals, such as domestic animals and poultry, when used in feed.

(4) Tea leaf fiber, obtained by extracting and removing soluble components from tea leaves using water, alcohol, acetone or a mixture thereof, improves animal intestinal function, decreases the occurrence of diarrhea, increases milk yield, improves feed efficiency and eliminates animal fecal and urinary malodor, when added to animal feed.

Specifically, the present invention is mainly concerned with the following points:

(1) A feed additive for animals comprising tea extract;
(2) The feed additive for animals as described in the above (1), wherein the tea is green tea, oolong tea, or black tea;
(3) The feed additive for animals as described in the above (1), wherein the tea extract is obtained by extracting tea leaves with water, alcohol and/or ethyl acetate;
(4) The feed additive as described in the above (1), wherein the tea extract comprises polyphenol compounds;
(5) The feed additive as described in the above (4), wherein the content of the polyphenol compounds is 5 to 80%;
(6) The feed additive for animals as described in the above (4), wherein the polyphenol compounds comprise one or more compounds selected from the group consisting of (+)-catechin, (+)-gallocatechin, (−)-gallocatechin gallate,
(−)-epicatechin, (−)-epicatechin gallate,
(−)-epigallocatechin, (−)-epigallocatechin gallate, free teaflavin, teaflavin monogallate A, teaflavin monogallate B and teaflavin digallate;

(7) The feed additive for animals as described in the above (6), wherein the contents of each polyphenol compound in the polyphenol compounds are 0.2 to 6.5% for (+)-catechin, 2.0 to 18.0% for (+)-gallocatechin, 1.0 to 15.0% for (−)-gallocatechin gallate, 0.5 to 10.0% for (−)-epicatechin, 0.3 to 8.0% for (−)-epicatechin gallate, 2.0 to 18.0% for (−)-epigallocatechin, 3.0 to 21.0% for (−)-epigallocatechin gallate, 0 to 20.0% for free teaflavin, 0 to 5.0% for teaflavin monogallate A, 0 to 5.0% for teaflavin monogallate. B and 0 to 5.0% for teaflavin digallate;

(8) An animal feed usable for the prevention or treatment of diarrhea comprising the feed additive for animals as described in any one of the above (1) to (7);

(9) The animal feed as described in the above (8), wherein the diarrhea is noninfectious diarrhea;

(10) The animal feed as described in the above (9), wherein the noninfectious diarrhea is stress-induced diarrhea or diarrhea of unknown cause that is not associated with infectious microorganisms;

(11) The animal feed as described in the above (8), which further comprises a specific antibody against infectious microorganism or virus, or toxins produced thereby;

(12) The animal feed as described in the above (11), wherein the specific antibody is an egg yolk antibody obtained from eggs of egg laying hens hyperimmunized with infectious microorganism or virus, or a toxin produced thereby;

(13) The animal feed as described in the above (11), wherein the specific antibody is a milk antibody obtained from milk of a mammal hyperimmunized with infectious microorganism or virus, or a toxin produced thereby;

(14) The animal feed as described in the above (11), wherein the feed being formulated so that not less than 1 mg/kg of body weight of the specific antibody is given to animals, the specific antibody having a titer of not less than 1.5 times as high as that of a blank in an enzyme immunoassay;

(15) An animal feed which is used to increase milk yield, comprising the feed additive for animals as described in any one of the above (1) to (7);

(16) An animal feed which is used to improve milk quality, comprising the feed additive for animals as described in any one of the above (1) to (7);

(17) An animal feed which is used to improve reproductive efficiency, comprising the feed additive for animals as described in any one of the above (1) to (7);

(18) A feed additive for animals, wherein tea leaf fiber obtained by removing soluble components from tea leaves is an active ingredient, the soluble components being extracted with water, alcohol, acetone, or mixtures thereof;

(19) An animal feed which is used to improve intestinal bacterial flora, comprising the feed additive for animals as described in the above (18);

(20) An animal feed which is used to reduce or eliminate malodor, comprising the feed additive for animals as described in the above (18);

(21) An animal feed which is used to improve feed efficiency, comprising the feed additive for animals as described in the above (18);

(22) The animal feed according to any one of the above (8) to (17) and (19) to (21), wherein the animals are domestic animals, poultry, or pet animals;

(23) A method for producing the feed additive for animals as described in the above (1) to (7), comprising the steps of extracting tea leaves with water, alcohol and/or ethyl acetate at 30 to 95° C. for 0.5 to 7 hours; and spray-drying the obtained extract;

(24) A method for producing the feed additive for animals as described in any one of the above (1) to (7), comprising the steps of extracting tea leaves with water, alcohol and/or ethyl acetate at 30 to 95° C. for 0.5 to 7 hours; and concentrating the obtained extract by ultrafiltration membrane with a fractional molecular weight of 3000 to 6000 and then by reverse osmosis membrane;

(25) A method for producing the feed additive for animals as described in any one of the above (1) to (7), comprising the steps of extracting tea leaves with water and/or alcohol at 30 to 95° C. for 0.5 to 7 hours; and removing an ethyl acetate layer after conducting distribution with ethyl acetate;

(26) A feed additive for animals, wherein (−)-epigallocatechin gallate is an active ingredient; and

(27) An animal feed comprising the feed additive for animals as described in the above (26).

BEST MODE FOR CARRYING OUT THE INVENTION

The present invention relates to a tea-derived feed additive and an animal feed containing the additive. One embodiment of the present invention is to use tea extract, and the other is to use tea extract residue.

First, the embodiment using tea extract is described. The tea extract for the present invention is defined as an extract obtained from tea leaves using a solvent, such as water, alcohol or ethyl acetate, that contains one of the following polyphenol compounds.

In the present invention, polyphenol compounds are tannins, such as (+)-catechin, (+)-gallocatechin, (−)-gallocatechin gallate, (−)-epicatechin, (−)-epicatechin, gallate, (−)-epigallocatechin, (−)-epigallocatechin gallate, free teaflavin, teaflavin monogallate A, teaflavin monogallate B, and teaflavin digallate.

Although it is preferable that these polyphenol compounds be hot water extract components of teas, such as green tea, black tea and oolong tea, they can also be obtained from the ethyl acetate soluble fraction of water or alcohol extract of tea, or by ultrafiltration or reverse osmosis of water or alcohol extract of tea. There is no limitation on the method for extracting these polyphenol compounds from tea; for example, the following methods can be used.

For example, a solvent is added to tea, followed by stirring. The solution and residue are then separated; the obtained solution is dried to yield the desired polyphenol compounds. Here, the tea may be milled or not. The solvent used is not particularly limited; water, ethanol, acetone, etc. can be used, singly or in mixture at any ratio. The solvent may be previously heated (30–95° C.) in advance, and may be heated (30–95° C.) during stirring. Stirring time ranges from 30 minutes to 7 hours. Shorter stirring time results in poor extraction efficiency; longer stirring time does not give an extra effect. The separated solution may be dried immediately or after concentration. Ordinary methods for drying can be used, including spray drying, freeze drying and hot blow drying. Concentration can be achieved using an ultrafiltration membrane or reverse osmosis membrane. These may be used singly or in combination. Also, the purity of polyphenol compounds can be increased by redistributing the obtained extract. In this case, it is preferable to use a water-ethyl acetate system for distribution; polyphenol compounds are concentrated in the ethyl acetate fraction.

More specifically, available methods include (1) a method in which tea leaves are extracted with water, alcohol and/or ethyl acetate at 30–95° C. for 0.5 to 7 hours, and the obtained extract is spray dried, (2) a method in which tea leaves are extracted with water, alcohol and/or ethyl acetate at 30–95° C. for 0.5 to 7 hours, and the obtained extract is concentrated using an ultrafiltration membrane of a fractional molecular weight of 3,000 to 6,000, followed by further concentration using a reverse osmosis membrane, and (3) a method in which tea leaves are extracted with water and/or alcohol at 30–95° C. for 0.5 to 7 hours and distributed with ethyl acetate, and the obtained ethyl acetate layer is removed.

The tea extract thus obtained usually contains 2 or more polyphenol compounds. In the present invention, these polyphenol compounds may be used singly after isolation, or may be used as a mixture of two or more kinds. The extract thus obtained may also be used as is in the form of a crude extract containing polyphenol compounds. When a particular polyphenol compound is used singly, the compound is not limited; any of the polyphenol compounds of the present invention may be used, with preference given to (−)-epigallocatechin gallate. In this case, the compound is not limited to tea-derived compounds, i.e., the compound may be derived from a non-tea organisms, such as persimmon juice, or may be a chemically synthesized product.

The method for isolating the compound is not limited; ordinary methods can be used. For example, a solution of tea extract in ethyl acetate or the above-described ethyl acetate fraction is subjected to silica gel chromatography, followed by elution with an appropriate solvent, to isolate the desired compound. HPLC may be then used to obtain the compound with higher purity.

The animal feed additive of the present invention contains a thus-obtained polyphenol compound derived from tea extract. The polyphenol compound content in the animal feed additive of the present invention is normally 5–80%, preferably 10–50%, and more preferably 20–35%. Here, the contents of individual polyphenol compounds in the animal feed additive are 0.2–6.5% of (+)-catechin, 2.0–18.0t of (+)-gallocatechin, 1.0–15.0% of (−)-gallocatechin gallate, 0.5–10.0% of (−)-epicatechin, 0.3–8.0% of (−)-epicatechin gallate, 2.0–18.0% of (−)-epigallocatechin, 3.0–21.0% of (−)-epigallocatechin gallate, 0–20.0% of free teaflavin, 0–5.0% of teaflavin monogallate A, 0–5.0% of teaflavin monogallate B and 0–5.0% of teaflavin digallate.

These polyphenol compounds are contained in tea in large amounts, and they have already been used in a large number of foods, because they prevent diseases, such as dental caries, hyperlipidemia and cancer. Therefore, they are highly safe.

The animal feed additive of the present invention is administered, in the form of an animal feed containing polyphenol compounds, to domestic animals, poultry and pet animals.

Feed is given to domestic animals for the purpose of supplying nutritive substances, and is usually classified into rughage, concentrate and special feed. Although the feed to which the feed additive of the present invention is added is not limited, it is desirable that the feed additive of the present invention be added to concentrates, since diarrhea is likely when a large amount of concentrates of high protein content and high energy level is given to domestic animals. The polyphenol compounds contained in the feed additive of the present invention are known to possess antioxidant activity; from the viewpoint of antioxidant action on lipid components as well, it is desirable to add these compounds to concentrates. When the feed additive of the present invention is added to feed, it may be formulated along with feed components at the time of feed formulation, or may be added to feed at the time of feeding to domestic animals. There is no limitation on the method and time of addition to feed. No problems arise even when the feed additive of the present invention is used in combination with other feed additives, such as probiotics and antibiotics.

The amount of an animal feed additive added to the animal feed of the present invention can be adjusted as appropriate, with no particular limitation.

In the present specification, domestic animals and poultry are defined as industrially reared animals, such as cattle, pigs, horses, goats, sheep, foxes, minks, fowls, turkeys, wild ducks, quails, guinea fowls, ducks, musovy ducks, geese and pigeons; pet animals are defined as animals reared for personal hobby, such as dogs and cats.

The animal feed additive of the present invention and the animal feed containing the additive are useful in preventing and treating noninfectious diarrhea associated with rapid environmental changes, feed composition changes and inappropriate breeding husbandry in domestic animals, poultry and pet animals, or infectious diarrhea induced by pathogens, such as viruses and bacteria.

In the present invention, noninfectious diarrhea is stress diarrhea caused by stress exerted on domestic animals, poultry and pet animals, or diarrhea of unknown cause not associated with infectious microorganisms. Infectious diarrhea is diarrhea caused by pathogenic bacteria or viruses.

In the present invention, the dose for suppressive effect against noninfectious diarrhea in domestic animals, poultry and pet animals is normally 0.5 to 50 mg/kg body weight, preferably 2 to 20 mg/kg body weight, as daily dose of polyphenol compounds. If the dose is lower than 0.5 mg/kg body weight, no suppressive effect against noninfectious diarrhea is obtained. If the dose exceeds 50 mg/kg body weight, the antimicrobial activity of polyphenol compounds affects gastrointestinal microorganisms commonly present in domestic animals, poultry and pet animals. When (−)-epigallocatechin gallate is used after isolation, its daily dose is normally 0.03 to 5 mg/kg body weight, preferably 0.1 to 3 mg/kg body weight.

For inhibitory effect against infectious diarrhea, the dose of the feed additive in combination with a specific antibody is normally 0.3 to 25 mg/kg body weight, preferably 2 to 15 mg/kg body weight, as daily dose of polyphenol compounds. If the dose is less than 0.3 mg/kg body weight, no suppressive effect against infectious diarrhea is obtained. Polyphenol compounds can be quantified by the amount of tannin determined by the officially approved method for tannin analysis [Chakenhou, Vol. 71, pp. 43–74 (1990)].

In the present invention, a specific antibody is defined as an antibody that specifically binds to an infectious microorganism or virus in domestic animals, poultry or pet animals, or a toxin produced thereby. Useful antibodies include chicken egg antibodies obtained from eggs of egg laying hens hyperimmunized with infectious microorganisms or viruses in domestic animals, poultry or pet animals, or toxins produced thereby, and milk antibodies obtained from mammalian milk. Said antibodies are not limited as to purity, i.e., the antibody may be in a pure form; in the case of chicken egg antibodies, the antibody is not limited, and may be whole egg, egg yolk, whole egg liquid, egg yolk liquid, whole egg powder, egg yolk powder or water soluble egg yolk protein fraction powder as long as antibodies are contained therein. In the case of milk antibodies, the antibody is not limited, and may be whole milk powder, skim milk powder or milk serum protein powder, as long as antibodies are contained therein.

There is no limitation as to infectious microorganisms in domestic animals, poultry and pet animals. Such microorganisms include pathogenic bacteria and diarrheal viruses, such as Clostridium perfringens type A, Clostridium perfringens type C, Salmonella typhimurium, Salmonella dublin, Campylobacter jejuni, Campylobacter coli, Escherichia coli 0-88, Escherichia coli 0-99, Escherichia coli 987P, Staphylococcus aureus, Rotavirus KK-3 and Rotavirus NCDV. Although the animal to be hyperimmunized with such a microorganism or a toxin produced thereby may be any animals, as long as it is capable of producing a specific antibody against said microorganism or toxin, egg laying hens or mammals such as cattle, goats and sheep, which are capable of producing a large amount of specific antibody, are particularly preferable from the viewpoint of practical application of antibodies and composition thereof against infectious microorganisms in domestic animals, poultry and pet animals. Of these methods, the method in which an egg laying hen is immunized with such a microorganism or a toxin produced thereby, and an antibody is obtained from this egg, is preferable from the viewpoint of ease of hyperimmunization, antibody production capability and breeding husbandry cost and other factors.

An egg laying hen can be hyperimmunized by repeatedly challenging the hen with such a microorganism or virus in domestic animals, poultry and pet animals, or a toxin produced thereby, as an antigen, to increase the specific antibody in the chicken egg. Mammals, such as cattle, goats and sheep, can be hyperimmunized by repeatedly challenging them with said antigen to increase the specific antibody in milk.

In this case, the antigen used may be prepared by a known method. For example, after large-scale culture, an infectious microorganism in domestic animals, poultry and pet animals is attenuated or inactivated by a known method and used as an antigen.

Any method for immunizing egg laying hens or mammals with antigen can be used. For example, intramuscular injection, subcutaneous injection, intravenous injection, intraperitoneal injection and oral immunization via drinking water can be used.

Immunization with antigen is carried out repeatedly until the specific antibody titer in the chicken egg or milk reaches maximum, while the antibody titer is monitored by enzyme immunoassay, or the like. Said antibody titer can be kept above a given level throughout the egg laying period or colostrum secretion period, by repeatedly immunizing the egg laying hen or mammal with the antigen at appropriate intervals.

The amount of immunizing antigen should be chosen by preliminary testing etc. whenever necessary, because it varies depending on the kinds of subject animal and antigen. In immunizing egg laying hens with virus, for instance, the amount of antigen is usually 10 $\mu$g to 1 mg/hen/immunization, as viral amount.

A specific antibody can be prepared by immunizing an egg laying hen or mammal with an infectious microorganism in domestic animals, poultry and pet animals or a toxin produced thereby, as an antigen, and then collecting eggs or milk containing the specific antibody against said antigen.

When a chicken egg is used, whole egg liquid or egg yolk liquid is separated after eggs are broken, and homogenized using a homogenizer, etc. after which it is sterilized and subjected to hot blow drying or freeze drying, to yield a whole egg powder or egg yolk powder containing a specific antibody against the antigen used. Also, it is possible to prepare a water soluble egg yolk protein powder of increased purity of specific antibody against the antigen used, or a pure powder of the specific antibody, from said egg yolk liquid or egg yolk powder, by a known method for purifying a chicken egg antibody [Japanese Patent Laid-Open No. 64-38098; Agric. Biol. Chem., Vol. 54, No. 10, pp. 2531–2535 (1990)].

When milk is used, said milk, or skim milk obtained by separating the lipid components therefrom using a cream separator, etc., is sterilized, after which it is subjected to hot blow drying or freeze drying, to yield a whole milk powder or skim milk powder containing a specific antibody against the antigen used. It is also possible to prepare a whey protein powder of improved purity of specific antibody against the antigen used, a pure product of the specific antibody, or the like, from said milk or said skim milk, by a known method.

In the present invention, for obtaining a suppressive effect against infectious diarrhea, the amount of specific antibody used in combination with polyphenol compounds is preferably such that the specific antibody with an antibody titer not less than 1.5 times the blank antibody titer, as determined by enzyme immunoassay, is administered at a dose of not less than 1 mg/kg body weight, preferably not less than 5 mg/kg body weight. Doses less than 1 mg/kg body weight are undesirable, because the desired effect is not obtained.

Although the present invention is applicable to all domestic animals, poultry and pet animals, from the viewpoint of efficacy or palatability, it is preferable to apply the present invention to herbivorous animals, particularly those which are industrially useful, including cattle, such as dairy cows and beef cattle, goats, sheep and deer, because herbivorous animals are capable of easily ingest polyphenol compounds irrespective of their bitterness.

Also, the animal feed additive of the present invention and an animal feed containing the additive is useful in improving the quality and quantity of fresh milk produced by domestic animals.

For improving the quality and quantity of fresh milk in the present invention, the feed additive of the present invention is normally administered to domestic animals at a daily dose of 0.5 to 50 mg/kg body weight, preferably 2 to 20 mg/kg body weight daily, as polyphenol compounds. If the dose is less than 0.5 mg/kg body weight, the desired effect of the present invention is not obtained; if the dose exceeds 50 mg/kg body weight, the antimicrobial activity of polyphenol compounds adversely affects microorganisms commonly present in the digestive tracts of domestic animals and poultry. Polyphenol compounds can be quantified by the amount of tannin determined by the above-described officially approved method for tannin analysis. When (−)-epigallocatechin gallate is used after isolation, its daily dose is normally 0.03 to 5 mg/kg body weight, preferably 0.1 to 3 mg/kg body weight.

In the present invention, polyphenol compounds may be administered to any domestic animal for fresh milk production, such as dairy cows, goats, horses and sheep. Although there is no limitation as to the kind of domestic animal, from the viewpoint of dairy industry and palatability associated with the bitterness of polyphenol compounds, dairy cows are particularly preferable.

In addition, the animal feed additive of the present invention and an animal feed containing the additive are effective in improving the reproductive efficiency for domestic animals and poultry.

The daily dose for such improvement of reproductive efficiency is normally 0.5 to 50 mg/kg body weight, preferably 2 to 20 mg/kg body weight, daily, as polyphenol compounds. If the dose is below this range, the desired effect of the present invention is not obtained; if the dose exceeds this range, the antimicrobial activity of polyphenol compounds adversely affects the microorganisms commonly present in the digestive tract. Polyphenol compounds can be quantified by the above-described officially approved method for tannin analysis. When (−)-epigallocatechin gallate is used after isolation, its daily dose is normally 0.03 to 5 mg/kg body weight, preferably 0.1 to 3 mg/kg body weight.

In the present invention, although there is no limitation as to the kind of domestic animal or poultry to which polyphenol compounds are administered, it is preferable that the present invention be applied to dairy cows, from an industrial viewpoint. If a dairy cow is the subject, reproductive efficiency can be evaluated by measuring the period of time required from parturition to conception and the number of artificial inseminations attempted in a dairy cow before pregnancy was confirmed.

Another embodiment of the present invention provides a feed additive and an animal feed which contain tea leaf fiber as an active ingredient.

When an animal feed supplemented with a feed additive containing tea leaf fiber is given to animals, such as domestic animals and poultry, intestinal function is improved by improved intestinal bacterial flora, resulting in reduced occurrence of diarrhea, increased milk yield, improved feed efficiency, and decreased or eliminated fecal and urinary malodor. This is because the cell count of useful bacteria, such as Bifidobacterium and Lactobacillus, among the microorganisms commonly present in the digestive tract, is increased, while the cell count of harmful bacteria, such as pathogenic *Escherichia coli* and *Clostridium perfringens*, is decreased, by the combined effect of cellulose (tea leaf fiber) and polyphenol compounds remaining in tea leaf fiber (extract residue); the above-described effect is thus achieved. The content of polyphenol compounds remaining in tea leaf fiber is normally about 2–5%.

The tea leaf fiber for the present invention can be obtained as an extract residue by extracting milled tea leaves with a 5- to 20-fold volume of water, alcohol, acetone or a mixture thereof, and removing the soluble components from the extract. Although any alcohol can be used, such alcohols as methanol, ethanol, propanol, isopropanol, and butanol are preferably used. The starting material tea leaves may be used at any stage of ordinary production process from fresh leaves to finished tea (dry tea), and non-fermented tea, semi-fermented tea and fermented tea can all be used, irrespective of the degree of fermentation. Heating at the time of extraction does not cause any problems; in the case of water extraction, it is desirable to heat at not lower than 60° C., preferably 75–90° C., for 0.5 to 7 hours. Extraction of 10 kg of tea leaves with 50 to 200 kg of water yields 20 to 40 kg of extract residue and 40 to 160 kg of extract of a Brix value of 2 to 10, depending on the amount of water added. The obtained extract residue can be dried by an ordinary method, such as hot blow drying or freeze drying after which it can be milled and mixed in feed. From 10 kg of tea leaves, 6 to 8 kg of tea leaf fiber is thus obtained. The obtained tea leaf fiber is preferred for use as a feed additive and an animal feed, in comparison with the starting material tea leaves, since it provides improved taste, with reduced bitterness and astringency, because more than about 70% of caffeine and tea polyphenol compounds have been removed.

In the present invention, production of tea leaf fiber can be combined with the above-described method for producing polyphenol compounds, whereby the productivities of both production methods are increased; this aspect is also a feature of the present invention.

It is desirable that the amount of tea leaf fiber (including polyphenol compounds remaining in tea leaf fiber) added to a domestic animal feed be not less than 0.01% by weight. There is no limitation as to the method for adding tea leaf fiber to a feed as long as the tea leaf fiber thus added can orally be given to animals; tea leaf fiber may be added as appropriate during any production process.

The present invention is hereinafter described in more details by means of the following examples and experimental examples, but the present invention is not limited by them.

EXAMPLE 1

To 1 kg of green tea leaves, about 15 L of water was added, and 3-hour extraction was conducted at 80° C. with stirring. The extract obtained after filtration was spray-dried to obtain 350 g of hot water extract of green tea which contains polyphenol compounds of 25% purity. Components of the polyphenol compounds thus obtained were 1.2% (+)-catechin, 5.0% (+)-gallocatechin, 3.9% (−)-gallocatechin gallate, 2.3% (−)-epicatechin, 1.5% (−)-epicatechin gallate, 5.0% (−)-epigallocatechin, and 6.1% (−)-epigallocatechin gallate. The content of the polyphenol compounds in the extract was quantified according to the above-mentioned officially approved method for tannin analysis, and individual components were determined by HPLC analysis. The high performance liquid chromatography was performed using 655A-11 LC manufactured by Hitachi using the following conditions:

Column: J' sphere ODS-M80 (manufactured by YMC K.K.);

Solvent: 20 mM $KH_2PO_4$-$H_3PO_4$ (pH2.4)/methanol (75:25, v/v);

Flow rate: 0.8 ml/min; and

Detection: 280 nm UV.

In the following examples, contents of the polyphenol compounds and components thereof were determined by the above-mentioned method.

EXAMPLE 2

Two hundred grams of green tea leaves was subjected to extraction with 4 L of hot water at 85° C. for 30 minutes with stirring. The tea leaves were filtered out to obtain 2.5 L of extract. The extract was filtered through an ultrafiltration apparatus (manufactured by DDS, GR-81PP of membrane type, a fractional molecular weight of 6000) to obtain 2 L of filtrate. After 1 L of water was added to the concentrated residual solution, the solution was treated similarly to obtain 1.2 L of filtrate. Both these filtrates were combined and concentrated to 200 ml using reverse osmotic membrane (manufactured by DDS, HC-50 of membrane type), which was freeze-dried to obtain 48.6 g of hot water extract of tea which contains polyphenol compounds of 29% purity. Components of the polyphenol compounds obtained were 1.4% (+)-catechin, 5.8% (+)-gallocatechin, 4.5% (−)- gallocatechin gallate, 2.7% (−)-epicatechin, 1.8% (−)-epicatechin gallate, 5.8% (−)-epigallocatechin, and 7.0% epigallocatechin gallate.

EXAMPLE 3

To 350 g of the hot water extract obtained in Example 1, 8 L of water was added to solve the extract. The extract was distributed between water and hexane, and then between water and chloroform. To the water layer after the distribution, 10 L of ethyl acetate was added. After the mixture was vigorously stirred and allowed to stand for a while, the layer of ethyl acetate was separated, from which ethyl acetate was removed by distillation. The residue was dried to obtain 70 g of ethyl acetate soluble fraction (as a mixture containing polyphenol compounds at 74.5% purity).

The content of the total polyphenol compounds in the ethyl acetate soluble fraction was 74.5%, and contents of individual polyphenol compounds were 3.5% for (+)-catechin, 14.8% for (+)-gallocatechin, 11.6% for (−)-gallocatechin gallate, 7% for (−)-epicatechin, 4.6% (−)-epicatechin gallate, 15.0% (−)-epigallocatechin, and 18.0% epigallocatechin gallate.

EXAMPLE 4

Each of the following causative bacteria for bovine infectious diarrhea was grown in a brain heart infusion medium: *Salmonella dublin, Escherichia coli* 0-88, *Escherichia coli* 0-99 and *Escherichia coli* 987P. Also, each of bovine Rotavirus KK-3 and bovine Rotavirus NCDV was cultured using MA 104 cells of rhesus origin as the host cells grown in Eagle's MEM medium. Egg-laying hens were hyperimmunized using each of the bacteria and viruses as the antigen. From 10 kg of the egg yolk of the hens, the egg yolk antibody specific to each bacterium was obtained in an amount of 45 g.

EXAMPLE 5

Ten grams of the ethyl acetate soluble fraction obtained in Example 3 was subjected to a silica gel column (5×80 cm) and eluted using a mixture of chloroform and methanol. The elution was carried out in 2 steps: first eluted with the mixture mixed at a ratio of 20:1 (v/v) and then eluted with the mixture mixed at a ratio of 10:1 (v/v). Each of the polyphenol compounds obtained was further separated and purified with a recycle HPLC (LC-908, GS-320 column, using methanol solvent, manufactured by Nippon Analysis Industry) to obtain a polyphenol compound of high purity. The polyphenol compounds obtained were 0.3 g of (+)-catechin, 1.22 g of (+)-gallocatechin, 0.9 g of (−)-gallocatechin gallate, 0.5 g of (−)-epicatechin, 0.38 g of (−)-epicatechin gallate, 1.2 g of (−)-epigallocatechin, and 1.5 g of (−)-epigallocatechin gallate.

EXPERIMENTAL EXAMPLE 1

Thirty calves were divided into the following 3 groups of 10 calves each and fed for 5 weeks: Group A where only artificial milk was given; Group B where 0.7 g/day of the tea extract prepared in Example 1 was given; and Group C where 1.5 g/day of the tea extract prepared in Example 1 was given. The tea extract was mixed with artificial milk and given to the animals. The animals took water ad libitum. The artificial milk used was Calftop manufactured by Zenrakuren. In the following Experimental Examples, the artificial milk used was Calftop. As indexes for non-infectious diarrhea, fecal score and intestinal bacterial flora were measured from week 0 to week 5 after the start of this experiment. The fecal score is a score given to fecal conditions: 0 for normal feces, 1 for soft feces, 2 for muddy feces, and 3 for watery feces. The results are shown in Tables 1 and 2.

TABLE 1

Fecal score

|  | Week 0 | Week 1 | Week 2 | Week 3 | Week 4 | Week 5 |
|---|---|---|---|---|---|---|
| Group A | 3 | 3 | 3 | 3 | 3 | 3 |
| Group B | 3 | 3 | 2.5 | 2.5 | 2.5 | 1.2 |
| Group C | 3 | 0 | 0 | 0 | 0 | 0 |

Means for 10 animals.
Normal feces scored 0; soft feces, 1; muddy feces, 2; and watery feces, 3.

TABLE 2

Intestinal bacterial flora

| | | Week 0 | Week 1 | Week 2 | Week 3 | Week 4 | Week 5 |
|---|---|---|---|---|---|---|---|
| Group A | Total bacterial count | 10.2 | 9.8 | 9.8 | 9.7 | 9.8 | 9.8 |
| | Bacteroidaceae | 9.5 | 8.7 | 8.7 | 8.0 | 7.5 | 7.0 |
| | Bifidobacterium | 6.8 | 5.0 | 4.3 | 4.3 | 4.0 | 4.0 |
| | *Clostridium perfringens* | 4.5 | 4.3 | 3.8 | 3.6 | 3.6 | 3.8 |
| | Enterobacteriaceae | 8.2 | 7.8 | 6.5 | 6.2 | 6.2 | 6.2 |
| | Lactobacillus | 5.8 | 4.2 | 4.2 | 3.8 | 3.6 | 3.6 |
| | Streptococcus | 6.9 | 6.5 | 6.0 | 5.5 | 4.5 | 4.0 |
| | Staphylococcus | 4.2 | 4.0 | 3.5 | 3.0 | 2.5 | 2.4 |
| Group B | Total bacterial count | 10.2 | 10.1 | 10.1 | 9.8 | 9.8 | 9.7 |
| | Bacteroidaceae | 9.6 | 9.1 | 9.1 | 9.1 | 8.9 | 8.8 |
| | Bifidobacterium | 6.9 | 5.7 | 5.5 | 5.3 | 4.8 | 4.8 |
| | *Clostridium perfringens* | 4.5 | 4.0 | 3.8 | 3.4 | 3.3 | 3.3 |
| | Enterobacteriaceae | 8.2 | 8.0 | 7.7 | 7.5 | 7.4 | 7.2 |
| | Lactobacillus | 5.7 | 5.0 | 4.8 | 4.3 | 3.9 | 3.9 |
| | Streptococcus | 6.9 | 6.6 | 6.2 | 5.8 | 5.5 | 5.0 |
| | Staphylococcus | 4.2 | 3.8 | 3.6 | 3.5 | 3.2 | 2.8 |
| Group C | Total bacterial count | 10.2 | 9.8 | 9.8 | 9.5 | 9.2 | 9.2 |
| | Bacteroidaceae | 9.6 | 9.6 | 9.6 | 9.4 | 9.4 | 9.4 |
| | Bifidobacterium | 6.9 | 7.0 | 7.1 | 7.0 | 6.8 | 6.8 |
| | *Clostridium perfringens* | 4.6 | 3.9 | 3.5 | 3.3 | 3.1 | 3.0 |
| | Enterobacteriaceae | 8.2 | 8.2 | 7.8 | 7.6 | 7.7 | 7.5 |
| | Lactobacillus | 5.8 | 5.5 | 5.2 | 5.0 | 5.0 | 4.8 |
| | Streptococcus | 6.8 | 6.8 | 6.5 | 6.0 | 5.8 | 5.5 |

TABLE 2-continued

| | Intestinal bacterial flora | | | | | |
|---|---|---|---|---|---|---|
| | Week 0 | Week 1 | Week 2 | Week 3 | Week 4 | Week 5 |
| Staphylococcus | 4.2 | 3.5 | 3.0 | 2.8 | 2.5 | 2.3 |

Means for 10 animals.
Count per 1 g of feces is expressed in logarithmic value.

From Tables 1 and 2, it is found that the calves in Group C showed low fecal scores, decreased bacterial counts of *Clostridium perfringens* and Enterobacteriaceae, and suppressed rates of reduction in Bifidobacterium and Lactobacillus counts, when compared with the calves in Groups A and B. This indicates that the tea extract of the present invention effectively inhibits non-infectious diarrhea in calves. Similar results were obtained when the same procedures as this experiment were followed using the tea extract prepared in Example 2 or 3. Moreover, when the same type of experiment as this was carried out using extract from black tea or oolong tea, similar results were obtained.

EXPERIMENTAL EXAMPLE 2

Fifteen cows soon after parturition were divided into the following 3 groups of 5 cows and fed for 5 weeks: Group D where the basic feed as listed in Table 3 was given; Group E where 10 g/day of the tea extract prepared in Example 1 was given; and Group F where 15 g/day of the tea extract prepared in Example 1 was given. The tea extract was mixed with the basic feed in Table 3 and given to the animals. The animals were allowed to have access to water ad libitum. Similarly to Experimental Example 1, fecal score and intestinal bacterial flora were determined from week 0 to week 5 after the start of this experiment as indexes for non-infectious diarrhea. The results are shown in Tables 4 and 5.

TABLE 3

| Ingredients of basic feed | |
|---|---|
| Corn | 30.0 parts by weight |
| Milo | 13.5 parts by weight |
| Wheat bran | 7.0 parts by weight |
| Soybean cake | 24.6 parts by weight |
| Wheat flour | 18.0 parts by weight |
| Yellow grease | 0.7 parts by weight |
| Molasses | 3.0 parts by weight |
| Calcium carbonate | 1.6 parts by weight |
| Calcium tertiary phosphate | 0.5 parts by weight |
| Salt | 0.5 parts by weight |
| Vitamines and minerals | 0.2 parts by weight |

TABLE 4

| | Fecal score | | | | | |
|---|---|---|---|---|---|---|
| | Week 0 | Week 1 | Week 2 | Week 3 | Week 4 | Week 5 |
| Group D | 3 | 3 | 3 | 3 | 3 | 3 |
| Group E | 3 | 3 | 2.6 | 2 | 1.8 | 1.2 |
| Group F | 3 | 0 | 0 | 0 | 0 | 0 |

Means for 10 animals.
Normal feces scored 0; soft feces, 1; muddy feces, 2; and watery feces, 3.

TABLE 5

| | Intestinal bacterial flora | | | | | | |
|---|---|---|---|---|---|---|---|
| | | Week 0 | Week 1 | Week 2 | Week 3 | Week 4 | Week 5 |
| Group D | Total bacterial count | 7.2 | 7.1 | 7.3 | 7.1 | 7.0 | 7.0 |
| | Bacteroidaceae | 5.0 | 5.2 | 5.5 | 6.0 | 6.0 | 6.2 |
| | Bifidobacterium | 5.0 | 4.0 | 4.5 | 4.2 | 4.2 | 4.0 |
| | *Clostridium perfringens* | 1.8 | 2.2 | 2.4 | 2.6 | 2.6 | 2.8 |
| | Enterobacteriaceae | 5.0 | 5.0 | 5.0 | 5.2 | 5.2 | 5.2 |
| | Lactobacillus | 6.0 | 6.2 | 5.9 | 5.5 | 5.3 | 5.0 |
| | Streptococcus | 4.0 | 3.5 | 3.3 | 3.2 | 3.3 | 3.2 |
| | Staphylococcus | 7.5 | 7.5 | 7.4 | 7.5 | 7.5 | 7.5 |
| Group E | Total bacterial count | 7.1 | 7.0 | 7.1 | 7.2 | 7.0 | 7.1 |
| | Bacteroidaceae | 5.2 | 5.3 | 5.5 | 5.8 | 5.9 | 5.9 |
| | Bifidobacterium | 5.1 | 5.0 | 4.9 | 4.8 | 4.9 | 4.8 |
| | *Clostridium perfringens* | 2.0 | 2.0 | 2.2 | 2.2 | 2.4 | 2.4 |
| | Enterobacteriaceae | 5.2 | 5.3 | 5.2 | 4.9 | 4.9 | 4.9 |
| | Lactobacillus | 6.2 | 6.0 | 6.3 | 6.3 | 6.2 | 6.3 |
| | Streptococcus | 4.1 | 3.4 | 3.2 | 3.0 | 3.0 | 3.0 |
| | Staphylococcus | 7.5 | 7.0 | 7.0 | 7.0 | 7.0 | 7.0 |
| Group F | Total bacterial count | 7.2 | 7.3 | 7.4 | 7.3 | 7.2 | 7.3 |
| | Bacteroidaceae | 5.1 | 5.2 | 5.4 | 5.6 | 5.5 | 5.5 |
| | Bifidobacterium | 4.9 | 5.2 | 5.8 | 6.2 | 6.5 | 6.8 |
| | *Clostridium perfringens* | 2.3 | 2.1 | 1.7 | 1.7 | 1.5 | 1.5 |
| | Enterobacteriaceae | 5.3 | 5.0 | 4.8 | 4.5 | 4.3 | 4.3 |
| | Lactobacillus | 6.1 | 6.5 | 6.8 | 7.1 | 7.1 | 7.3 |
| | Streptococcus | 4.1 | 3.1 | 3.0 | 2.5 | 2.5 | 2.5 |
| | Staphylococcus | 7.8 | 7.0 | 6.5 | 6.0 | 6.0 | 5.8 |

Mean for 5 animals.
Count per 1 g of feces is expressed in logarithmic value.

From Tables 4 and 5, it is found that the cows in Group F showed low fecal scores, decreased counts of *Clostridium perfringens* and Enterobacteriaceae, and increased counts of Bifidobacterium and Lactobacillus, when compared with the cows in Groups D and E. This indicates that the tea extract of the present invention effectively inhibits diarrhea due to stress of parturition (non-infectious diarrhea). Similar results were obtained when the same procedures as this experiment were followed using the tea extract prepared in Example 2 or 3. Moreover, when the same type of experiment as this was carried out using extract from black tea or oolong tea, similar results were obtained.

EXPERIMENTAL EXAMPLE 3

Thirty calves that had been infected with *Salmonella dublin* were divided into the following 3 groups of 10 calves each and fed for 5 weeks: Group G where only artificial milk was given; Group H where 1.5 g/day of the tea extract prepared in Example 1 was given; Group I where 1.5 g/day of the tea extract prepared in Example 1 and 400 mg/day of the specific egg yolk antibody prepared in Example 4 was given; and Group H2 where 400 mg/day of the specific egg yolk antibody prepared in Example 4 was given. The tea extract and the specific egg yolk antibody were mixed with artificial milk and given to the animals. As indexes for diarrhea, fecal score and *Salmonella dublin* count in feces were determined from week 0 to week 5 after the start of the experiment. The results are shown in Tables 6 and 7.

TABLE 6

Fecal score

| | Week 0 | Week 1 | Week 2 | Week 3 | Week 4 | Week 5 |
|---|---|---|---|---|---|---|
| Group G | 3 | 3 | 3 | 3 | 3 | 3 |
| Group H | 3 | 3 | 2.8 | 2.5 | 2.5 | 2.5 |
| Group I | 3 | 0 | 0 | 0 | 0 | 0 |
| Group H 2 | 3 | 3 | 2.9 | 2.4 | 2.6 | 2.5 |

Means for 10 animals.
Normal feces scored 0; soft feces, 1; muddy feces, 2; and watery feces, 3.

TABLE 7

Bacterial count of *Salmonella dublin* in feces

| | Week 0 | Week 1 | Week 2 | Week 3 | Week 4 | Week 5 |
|---|---|---|---|---|---|---|
| Group G | 3.35 | 3.32 | 3.31 | 3.33 | 3.30 | 3.31 |
| Group H | 3.40 | 3.35 | 3.37 | 3.36 | 3.38 | 3.35 |
| Group I | 3.51 | 2.51 | 2.44 | 2.37 | 2.03 | 1.33 |
| Group H 2 | 3.43 | 3.37 | 3.37 | 3.34 | 3.34 | 3.35 |

Means for 10 animals.
Count per 1 g of feces is expressed in logarithmic value.

From Tables 6 and 7, it is found that the calves in Group I showed low fecal scores and decreased counts of *Salmonella dublin* in feces as compared with the calves in Groups G, H, and H2. This indicates that the tea extract of the present invention effectively inhibits infectious diarrhea. Similar results were obtained when the same procedures as this experiment were followed using the tea extract prepared in Example 2 or 3. Moreover, when the same type of experiment as this was carried out using extract from black tea or oolong tea, similar effects were obtained. When a similar experiment on infectious diarrhea was conducted in animals infected with *Escherichia coli* 0-88, *Escherichia coli* 0-99, *Escherichia coli* 987P, bovine Rotavirus KK-3 or bovine Rotavirus NCDV, similar results were obtained.

EXPERIMENTAL EXAMPLE 4

Fifteen cows that had been infected with *Salmonella dublin* were divided into the following 3 groups of 5 cows each and fed for 5 weeks: Group J where only the basic feed as listed in Table 3 was given; Group K where 7.5 g/day of the tea extract prepared in Example 1 was given; Group L where 7.5 g/day of the tea extract prepared in Example 1 and 6 g/day of the specific egg yolk antibody prepared in Example 4 were given; Group K2 where 6 g/day of the specific egg yolk antibody prepared in Example 4 was given. The tea extract and the specific egg yolk antibody were mixed with the basic feed as listed in Table 3 and given to the animals. The animals were allowed to have access to water ad libitum. Similarly to Experimental Example 3as indexes for diarrhea, fecal score and *Salmonella dublin* count in feces were determined from week 0 to week 5 after the start of the experiment. The results are shown in Tables 8 and 9.

TABLE 8

Fecal score

| | Week 0 | Week 1 | Week 2 | Week 3 | Week 4 | Week 5 |
|---|---|---|---|---|---|---|
| Group J | 3 | 3 | 3 | 3 | 3 | 3 |
| Group K | 3 | 3 | 2.8 | 2.8 | 2.6 | 2.2 |
| Group L | 3 | 0 | 0 | 0 | 0 | 0 |
| Group K 2 | 3 | 3 | 2.9 | 2.7 | 2.7 | 2.3 |

Means for 5 animals.
Normal feces scored 0; soft feces, 1; muddy feces, 2; and watery feces, 3.

TABLE 9

Bacterial count of *Salmonella dublin* in feces

| | Week 0 | Week 1 | Week 2 | Week 3 | Week 4 | Week 5 |
|---|---|---|---|---|---|---|
| Group J | 3.41 | 3.44 | 3.40 | 3.39 | 3.41 | 3.40 |
| Group K | 3.35 | 3.37 | 3.36 | 3.35 | 3.37 | 3.37 |
| Group L | 3.39 | 2.51 | 2.45 | 2.01 | 1.97 | 1.23 |
| Group K 2 | 3.37 | 3.33 | 3.30 | 3.31 | 3.32 | 3.31 |

Means for 5 animals.
Count per 1 g of feces is expressed in logarithmic value.

From Tables 8 and 9, it is found that the cows in Group L show lower fecal scores and smaller counts of *Salmonella dublin* in feces as compared with the cows in Groups J, K, and K2. This indicates that the tea extract of the present invention effectively inhibits infectious diarrhea. Similar results were obtained when the same procedures as this experiment were followed using the tea extract prepared in Example 2 or 3. Moreover, when the same type of experiment as this was carried out using extract from black tea or oolong tea, similar results were obtained. When a similar experiment was conducted using *Escherichia coli* 0-88, *Escherichia coil* 0-99 , *Escherichia coil* 987P, bovine Rotavirus KK-3 or bovine Rotavirus NCDV, similar results were obtained.

EXPERIMENTAL EXAMPLE 5

Thirty healthy cows were divided into the following 3 groups of 10 cows each and fed for 5 weeks: Group A where 15 g/day of the tea extract prepared in Example 1 was given; 7.5 g/day of the tea extract prepared in Example 1 was given; and Group C where the tea extract was not given. The tea extract was mixed with usual feed and given to the animals. As indexes for quality and yield of milk, the milk obtained by milking the cows were measured by conventional methods for milk fat percentage, solids-not-fat percentage, cell count, milk protein percentage, and daily milk yield from week 0 to week 5 after the start of the experiment. The results are respectively shown in Tables 10 to 14. In addition, a sensory test for the milk by 15 panelists was conducted 3 weeks and 5 weeks after the start of the experiment. The results are shown in Table 15.

TABLE 10

Percentage of milk fat

|  | Week 0 | Week 1 | Week 2 | Week 3 | Week 4 | Week 5 |
|---|---|---|---|---|---|---|
| Group A | 3.32 | 3.40 | 3.55 | 3.65 | 3.65 | 3.64 |
| Group B | 3.38 | 3.43 | 3.58 | 3.58 | 3.57 | 3.58 |
| Group C | 3.35 | 3.36 | 3.35 | 3.34 | 3.33 | 3.34 |

Means for 10 animals.
The values are expressed in %.

TABLE 11

Percentage of solids-not-fat

|  | Week 0 | Week 1 | Week 2 | Week 3 | Week 4 | Week 5 |
|---|---|---|---|---|---|---|
| Group A | 8.36 | 8.49 | 8.50 | 8.62 | 8.62 | 8.62 |
| Group B | 8.37 | 8.47 | 8.49 | 8.53 | 8.53 | 8.53 |
| Group C | 8.39 | 8.38 | 8.38 | 8.35 | 8.35 | 8.35 |

Means for 10 animals.
The values are expressed in %.

TABLE 12

Cell count

|  | Week 0 | Week 1 | Week 2 | Week 3 | Week 4 | Week 5 |
|---|---|---|---|---|---|---|
| Group A | 9.6 | 7.5 | 6.8 | 5.3 | 5.3 | 5.3 |
| Group B | 9.8 | 8.1 | 7.5 | 6.5 | 6.5 | 6.5 |
| Group C | 9.6 | 9.7 | 9.6 | 9.5 | 9.6 | 9.5 |

Means for 10 animals.
The values are expressed in $1 \times 10^4$ count/ml.

TABLE 13

Percentage of milk protein

|  | Week 0 | Week 1 | Week 2 | Week 3 | Week 4 | Week 5 |
|---|---|---|---|---|---|---|
| Group A | 2.90 | 2.99 | 3.08 | 3.12 | 3.12 | 3.13 |
| Group B | 2.89 | 2.95 | 3.05 | 3.07 | 3.07 | 3.06 |
| Group C | 2.91 | 2.92 | 2.90 | 2.91 | 2.90 | 2.89 |

Means for 10 animals.
The values are expressed in %.

TABLE 14

Daily milk yield

|  | Week 0 | Week 1 | Week 2 | Week 3 | Week 4 | Week 5 |
|---|---|---|---|---|---|---|
| Group A | 19.8 | 22.3 | 24.6 | 27.5 | 27.0 | 27.0 |
| Group B | 19.5 | 20.5 | 22.1 | 23.9 | 23.8 | 23.9 |
| Group C | 19.4 | 19.4 | 19.3 | 19.3 | 19.0 | 18.8 |

Means for 10 animals.
The values are expressed in kg.

TABLE 15

Sensory test

|  | After 3 weeks | | | After 5 weeks | | |
|---|---|---|---|---|---|---|
|  | Flavor | Taste | Mouth feeling | Flavor | Taste | Mouth feeling |
| Group A | 4.7 | 5 | 4.7 | 5 | 5 | 5 |
| Group B | 4.3 | 4.7 | 4.3 | 4.7 | 4.7 | 4.0 |
| Group C | 2.3 | 2.7 | 2.5 | 2.0 | 2.5 | 2.2 |

Means for 15 panalists.
"Very good" scored 5; "Good," 4; "Average," 3; "Bad," 2; and "Very bad," 1.

As obvious from Tables 10 to 14, it is found that the milk obtained from cows in Group A showed increased percentages of milk fat, solids-not-fat, and milk protein, increased daily milk yield, and decreased cell count, as compared with the milk obtained from cows in Groups B and C. Specifically, two weeks after the start of feeding, the percentages of milk fat, solids-not-fat, and milk protein in Group A exceeded 3.5%, 8.5%, and 3.0%, respectively, and it was found that the milk met the criteria to be ranked as A. This indicates that the tea extract of the present invention is effective in improving milk quality and milk yield. In addition, the results of the sensory test by 15 panelists in Table 15 obviously indicate that the milk obtained from the cows in Group A are good in flavor, taste, and mouth feeling. Similar results were obtained when the same procedures as this experiment were followed using the tea extract prepared in Example 2 or 3. Moreover, when the same type of experiment as this was carried out using extract from black tea or oolong tea, similar results were obtained.

EXPERIMENTAL EXAMPLE 6

Twenty healthy cows that had just undergone parturition were divided into the following 2 groups of 10 cows each and fed for 1 year: Group A where 15 g/day of the tea extract prepared in Example 1 was given; and Group B where the extract was not given. The tea extract was mixed with usual feed and given to the animals. As indexes for reproductive efficiency, the time required from parturition to conception, and the number of artificial inseminations attempted before pregnancy was confirmed in a cow were checked. The respective results are shown in Tables 16 and 17.

TABLE 16

Time required from parturition to conception

|  | Not more than 40 days | 40–60 days | 60–80 days | Not less than 100 days |
|---|---|---|---|---|
| Group A | 3 cows | 5 cows | 2 cows | |
| Group B | | 2 cows | 3 cows | 3 cows |

TABLE 17

Number of artificial inseminations attempted before pregnancy was confirmed in a cow

|  | Once | Twice | Not less than 3 times |
|---|---|---|---|
| Group A | 8 cows | 1 cow | |
| Group B | 3 cows | 2 cows | 3 cows |

From Tables 16 and 17, it is found that the cows in Group A had shorter duration to the next conception and decreased number of artificial inseminations attempted in a cow before pregnancy was confirmed, indicating improved reproductive efficiency. Therefore, the tea extract of the present invention was proved to be effective in improving the reproductive efficiency in cows. Similar results were obtained when the same procedures as this experiment were followed using the tea extract prepared in Example 2 or 3. Moreover, when the same procedures as this experiment were followed using extract from black tea or oolong tea, similar results were obtained.

EXPERIMENTAL EXAMPLE 7

Thirty calves were divided into the following 3 groups of 10 calves each and fed for 5 weeks: Group A where only artificial milk was given; Group B where 90 mg/day of (+)-catechin prepared in Example 5 was given; and Group C where 90 mg/day of (−)-epigallocatechin gallate prepared in Example 5 was given. Each of the above 2 polyphenol compounds was mixed with artificial milk and given to the animals. The animals were allowed to have access to water ad libitum. As indexes for non-infectious diarrhea, fecal score and intestinal bacterial flora were determined from week 0 to week 5 after the start of this experiment. The results are shown in Tables 18 and 19.

TABLE 18

Fecal score

|  | Week 0 | Week 1 | Week 2 | Week 3 | Week 4 | Week 5 |
|---|---|---|---|---|---|---|
| Group A | 3 | 3 | 3 | 3 | 3 | 3 |
| Group B | 3 | 2.4 | 2.3 | 1.5 | 1.5 | 1.0 |
| Group C | 3 | 0 | 0 | 0 | 0 | 0 |

Means for 10 animals.
Normal feces scored 0; soft feces, 1; muddy feces, 2; and watery feces, 3.

TABLE 19

Intestinal bacterial flora

| | | Week 0 | Week 1 | Week 2 | Week 3 | Week 4 | Week 5 |
|---|---|---|---|---|---|---|---|
| Group A | Total bacterial count | 10.1 | 9.9 | 9.8 | 9.7 | 9.7 | 9.6 |
| | Bacteroidaceae | 9.4 | 8.5 | 8.4 | 8.0 | 7.6 | 7.1 |
| | Bifidobacterium | 6.9 | 5.1 | 4.2 | 4.2 | 3.9 | 3.9 |
| | *Clostridium perfringens* | 4.6 | 4.4 | 3.9 | 3.6 | 3.7 | 3.8 |
| | Enterobacteriaceae | 8.1 | 7.9 | 6.6 | 6.3 | 6.2 | 6.1 |
| | Lactobacillus | 5.6 | 4.1 | 4.1 | 3.9 | 3.7 | 3.7 |
| | Streptococcus | 7.0 | 6.6 | 6.1 | 5.4 | 4.6 | 4.3 |
| | Staphylococcus | 4.2 | 4.1 | 3.4 | 3.1 | 2.6 | 2.3 |
| Group B | Total bacterial count | 10.1 | 10.1 | 10.2 | 9.9 | 9.8 | 9.7 |
| | Bacteroidaceae | 9.6 | 9.1 | 9.1 | 9.0 | 8.8 | 8.8 |
| | Bifidobacterium | 6.9 | 5.6 | 5.4 | 5.3 | 4.8 | 4.7 |
| | *Clostridium perfringens* | 4.4 | 4.1 | 3.9 | 3.5 | 3.4 | 3.3 |
| | Enterobacteriaceae | 8.3 | 7.9 | 7.6 | 7.4 | 7.4 | 7.1 |
| | Lactobacillus | 5.6 | 4.9 | 4.8 | 4.2 | 3.9 | 3.8 |
| | Streptococcus | 6.8 | 6.8 | 6.3 | 5.8 | 5.6 | 5.1 |
| | Staphylococcus | 4.1 | 3.7 | 3.7 | 3.4 | 3.2 | 2.9 |
| Group C | Total bacterial count | 10.2 | 10.2 | 10.2 | 9.9 | 9.5 | 9.3 |
| | Bacteroidaceae | 9.6 | 9.5 | 9.4 | 9.4 | 9.3 | 9.2 |
| | Bifidobacterium | 6.9 | 7.0 | 7.2 | 7.2 | 6.7 | 6.6 |
| | *Clostridium perfringens* | 4.5 | 3.8 | 3.6 | 3.4 | 3.0 | 2.9 |
| | Enterobacteriaceae | 8.2 | 8.1 | 7.8 | 7.7 | 7.7 | 7.4 |

TABLE 19-continued

Intestinal bacterial flora

| | Week 0 | Week 1 | Week 2 | Week 3 | Week 4 | Week 5 |
|---|---|---|---|---|---|---|
| Lactobacillus | 5.8 | 5.6 | 5.6 | 5.3 | 5.4 | 5.1 |
| Streptococcus | 6.8 | 6.8 | 6.6 | 6.2 | 5.9 | 5.4 |
| Staphylococcus | 4.2 | 3.5 | 2.9 | 2.9 | 2.6 | 2.2 |

Means for 10 animals.
Count per 1 g of feces is expressed in logarithmic value.

Tables 18 and 19 show that the calves in Group C had lower fecal scores, greater reduction in *Clostridium perfringens* count and Enterobacteriaceae count, and greater inhibition upon the reduction rates of Bifidobacterium count and Lactobacillus count, indicating that non-infectious diarrhea was more effectively inhibited in Group C than in Groups A and B. Therefore, it was found that (−)-epigallocatechin gallate of the present invention effectively inhibited non-infectious diarrhea.

EXPERIMENTAL EXAMPLE 8

Fifteen cows that had just undergone parturition were divided into the following 3 groups of 5 cows each and fed for 5 weeks: Group D where only the basic feed as listed in Table 3 was given; Group E where 900 mg/day of (+)-catechin prepared in Example 5 was given; and Group F where 900 mg/day of (−)-epigallocatechin gallate prepared in Example 5 was given. Each of the above 2 polyphenol compounds was mixed with the basic feed listed in Table 3 and given to the animals. The animals were allowed to have access to water ad libitum. Similarly to Experimental Example 1, fecal score and intestinal bacterial flora were determined from week 0 to week 5 after the start of this experiment as indexes for non-infectious diarrhea. The results are shown in Tables 20 and 21.

TABLE 20

Fecal score

|  | Week 0 | Week 1 | Week 2 | Week 3 | Week 4 | Week 5 |
|---|---|---|---|---|---|---|
| Group D | 3 | 3 | 3 | 3 | 3 | 3 |
| Group E | 3 | 2.6 | 2.4 | 2 | 1.6 | 1.0 |
| Group F | 3 | 0 | 0 | 0 | 0 | 0 |

Means scores for 5 animals.
Normal feces scored 0; soft feces, 1; muddy feces, 2; and watery feces, 3.

TABLE 21

Intestinal bacterial flora

| | | Week 0 | Week 1 | Week 2 | Week 3 | Week 4 | Week 5 |
|---|---|---|---|---|---|---|---|
| Group D | Total bacterial count | 7.1 | 7.1 | 7.2 | 7.0 | 7.1 | 7.0 |
| | Bacteroidaceae | 5.1 | 5.0 | 5.6 | 5.9 | 6.1 | 6.1 |
| | Bifidobacterium | 5.1 | 4.1 | 4.2 | 4.2 | 4.1 | 4.1 |
| | *Clostridium perfringens* | 1.8 | 2.3 | 2.3 | 2.7 | 2.8 | 3.0 |
| | Enterobacteriaceae | 5.1 | 5.2 | 5.3 | 5.2 | 5.1 | 5.1 |
| | Lactobacillus | 6.0 | 6.0 | 5.8 | 5.4 | 5.2 | 4.9 |
| | Streptococcus | 4.0 | 3.7 | 3.5 | 3.3 | 3.3 | 3.3 |
| | Staphylococcus | 7.4 | 7.4 | 7.4 | 7.6 | 7.5 | 7.5 |
| Group E | Total bacterial count | 7.1 | 7.1 | 7.2 | 7.2 | 7.2 | 7.1 |

TABLE 21-continued

Intestinal bacterial flora

|  |  | Week 0 | Week 1 | Week 2 | Week 3 | Week 4 | Week 5 |
|---|---|---|---|---|---|---|---|
| | Bacteroidaceae | 5.2 | 5.3 | 5.3 | 5.1 | 4.9 | 4.9 |
| | Bifidobacterium | 5.1 | 5.2 | 5.2 | 5.3 | 5.5 | 5.5 |
| | *Clostridium perfringens* | 2.0 | 1.9 | 1.8 | 1.5 | 1.5 | 1.5 |
| | Enterobacteriaceae | 5.2 | 5.2 | 4.9 | 4.8 | 4.8 | 4.6 |
| | Lactobacillus | 6.0 | 6.2 | 6.3 | 6.4 | 6.4 | 6.5 |
| | Streptococcus | 4.0 | 3.3 | 3.0 | 3.1 | 3.1 | 3.0 |
| | Staphylococcus | 7.5 | 7.2 | 7.2 | 7.1 | 7.1 | 7.0 |
| Group F | Total bacterial count | 7.2 | 7.2 | 7.3 | 7.3 | 7.3 | 7.3 |
| | Bacteroidaceae | 5.1 | 5.1 | 5.0 | 4.9 | 4.9 | 4.9 |
| | Bifidobacterium | 4.8 | 5.1 | 5.3 | 6.3 | 6.6 | 6.9 |
| | *Clostridium perfringens* | 2.4 | 2.0 | 1.5 | 1.0 | 1.0 | 0 |
| | Enterobacteriaceae | 5.4 | 4.9 | 4.5 | 4.3 | 4.0 | 3.9 |
| | Lactobacillus | 6.0 | 6.6 | 6.9 | 7.3 | 7.4 | 7.6 |
| | Streptococcus | 4.2 | 3.9 | 3.5 | 3.4 | 3.3 | 3.0 |
| | Staphylococcus | 7.5 | 7.1 | 6.9 | 6.5 | 6.2 | 6.2 |

Means for 5 animals.
Count per 1 g of feces is expressed in logarithmic value.

From Tables 20 and 21, it is found that the cows in Group F had low fecal scores, reduced counts of *Clostridium perfringens* and Enterobacteriaceae, and increased counts of Bifidobacterium and Lctobacillus, when compared with the cows in Groups D and E. This indicates that (–)-epigallocatechin gallate of the present invention effectively inhibits diarrhea due to stress of parturition (non-infectious diarrhea).

EXPERIMENTAL EXAMPLE 9

Thirty calves infected with *Salmonella dublin* were divided into the following 3 groups of 10 calves each and fed for 5 weeks: Group G where only artificial milk was given; Group H where 90 mg/day of (–)-epigallocatechin gallate prepared in Example 5 was given; and Group I where 90 mg/day of (–)-epigallocatechin gallate prepared in Example 5 and 400 mg/day of the specific egg yolk antibody prepared in Example 4 were given. Each of the above 2 polyphenol compounds was mixed with artificial milk and given to the animals. As indexes for diarrhea, fecal score and bacterial count of *Salmonella dublin* in feces were determined from week 0 to week 5 after the start of the experiment. The results are shown in Tables 22 and 23.

TABLE 22

Fecal score

|  | Week 0 | Week 1 | Week 2 | Week 3 | Week 4 | Week 5 |
|---|---|---|---|---|---|---|
| Group G | 3 | 3 | 3 | 3 | 3 | 3 |
| Group H | 3 | 3 | 2.5 | 2.3 | 2.4 | 2.0 |
| Group I | 3 | 0 | 0 | 0 | 0 | 0 |

Means for 10 animals.
Normal feces scored 0; soft feces, 1; muddy feces, 2; and watery feces, 3.

TABLE 23

Bacterial count of *Salmonella dublin* in feces

|  | Week 0 | Week 1 | Week 2 | Week 3 | Week 4 | Week 5 |
|---|---|---|---|---|---|---|
| Group G | 3.34 | 3.33 | 3.33 | 3.33 | 3.35 | 3.34 |
| Group H | 3.35 | 3.33 | 3.12 | 3.10 | 3.03 | 3.01 |
| Group I | 3.35 | 2.49 | 2.37 | 2.01 | 1.98 | 1.20 |

Means for 10 animals.
Count per 1 g of feces is expressed in logarithmic value.

From Tables 22 and 23, it is found that the calves in Group I show lower fecal scores and decreased bacterial counts of *Salmonella dublin* in feces as compared with the calves in Groups G and H. This indicates that (–)-epigallocatechin gallate of the present invention effectively inhibits infectious diarrhea. When similar experiment on infectious diarrhea was conducted in animals infected with *Escherichia coli* 0-88, *Escherichia coli* 0-99, *Escherichia coli* 987P, bovine Rotavirus KK-3 and bovine Rotavirus NCDV, similar results were obtained.

EXPERIMENTAL EXAMPLE 10

Fifteen cows infected with *Salmonella dublin* were divided into the following 3 groups of 5 cows each and fed for 5 weeks: Group J where only the basic feed listed in Table 3 was given; Group K where 500 mg/day of (–)-epigallocatechin gallate prepared in Example 5 was given; and Group L where 500 mg/day of (–)-epigallocatechin gallate prepared in Example 5 and 6 g/day of the specific egg yolk antibody prepared in Example 4 were given. The (–)-epigallocatechin gallate or the specific egg yolk antibody were mixed with the basic feed listed in Table 3 and given to the animals. The animals were allowed to have access to water ad libitum. As indexes for diarrhea, fecal score and *Salmonella dublin* count in feces were measured from week 0 to week 5 after the start of the experiment. The results are shown in Tables 24 and 25.

TABLE 24

Fecal score

|  | Week 0 | Week 1 | Week 2 | Week 3 | Week 4 | Week 5 |
|---|---|---|---|---|---|---|
| Group J | 3 | 3 | 3 | 3 | 3 | 3 |
| Group K | 3 | 3 | 2.6 | 2.5 | 2.4 | 2.0 |
| Group L | 3 | 0 | 0 | 0 | 0 | 0 |

Means for 5 animals.
Normal feces scored 0; soft feces, 1; muddy feces, 2; and watery feces, 3.

TABLE 25

Bacterial count of *Salmonella dublin* in feces

|  | Week 0 | Week 1 | Week 2 | Week 3 | Week 4 | Week 5 |
|---|---|---|---|---|---|---|
| Group J | 3.35 | 3.35 | 3.34 | 3.33 | 3.34 | 3.34 |
| Group K | 3.34 | 3.30 | 3.10 | 3.00 | 3.00 | 2.98 |
| Group L | 3.35 | 2.10 | 2.05 | 1.99 | 1.64 | 1.05 |

Means for 5 animals.
Count per 1 g of feces is expressed in logarithmic value.

From Tables 24 and 25, it is found that the cows in Group L gave low fecal scores and decreased counts of *Salmonella dublin* in feces as compared with the cows in Groups J, K, and K2. This indicates that (–)-epigallocatechin gallate of the present invention effectively inhibits infectious diarrhea.

When a similar experiment was conducted in animals infected with *Escherichia coli* 0-88, *Escherichia coli* 0-99, *Escherichia coli* 987P, bovine Rotavirus KK-3 or bovine Rotavirus NCDV, similar results were obtained.

EXPERIMENTAL EXAMPLE 11

Thirty healthy cows were divided into the following 3 groups of 10 cows each and fed for 5 weeks: Group M where 900 mg/day of (−)-epigallocatechin gallate prepared in Example 5 was given; Group N where 900 mg/day of (+)-catechin prepared in Example 5 was given; and Group O where usual feed without addition of the above 2 polyphenol compounds was given. The above polyphenol compounds were given as a mixture with usual feed. As indexes for quality and yield of milk, the milk obtained by milking the cows was measured for milk fat percentage, solids-not-fat percentage, cell count, milk protein percentage, and daily milk yield according to the conventional methods from week 0 to week 5 after the start of the experiment. The results are shown in Tables 26 to 30. In addition, a sensory test for the milk by 15 panelists was conducted 3 weeks and 5 weeks after the start of the experiment. The results are shown in Tables 31.

TABLE 26

Percentage of milk fat

|  | Week 0 | Week 1 | Week 2 | Week 3 | Week 4 | Week 5 |
|---|---|---|---|---|---|---|
| Group M | 3.30 | 3.42 | 3.55 | 3.67 | 3.67 | 3.68 |
| Group N | 3.32 | 3.39 | 3.41 | 3.45 | 3.49 | 3.49 |
| Group O | 3.35 | 3.36 | 3.35 | 3.33 | 3.36 | 3.36 |

Means for 10 animals.
The values are expressed in %.

TABLE 27

Percentage of solids-not-fat

|  | Week 0 | Week 1 | Week 2 | Week 3 | Week 4 | Week 5 |
|---|---|---|---|---|---|---|
| Group M | 8.36 | 8.50 | 8.58 | 8.62 | 8.62 | 8.62 |
| Group N | 8.38 | 8.40 | 8.49 | 8.53 | 8.54 | 8.55 |
| Group O | 8.36 | 8.36 | 8.37 | 8.35 | 8.36 | 8.35 |

Means for 10 animals.
The values are expressed in %.

TABLE 28

Cell counts

|  | Week 0 | Week 1 | Week 2 | Week 3 | Week 4 | Week 5 |
|---|---|---|---|---|---|---|
| Group M | 9.7 | 7.4 | 6.2 | 5.3 | 5.3 | 5.0 |
| Group N | 9.6 | 8.0 | 7.4 | 6.8 | 6.5 | 6.3 |
| Group O | 9.5 | 9.7 | 9.5 | 9.4 | 9.6 | 9.5 |

Means for 10 animals.
The values are expressed in $\times 10^4$ count/ml.

TABLE 29

Percentage of milk protein

|  | Week 0 | Week 1 | Week 2 | Week 3 | Week 1 | Week 5 |
|---|---|---|---|---|---|---|
| Group M | 2.90 | 3.00 | 3.07 | 3.10 | 3.11 | 3.13 |
| Group N | 2.90 | 2.95 | 2.99 | 3.00 | 3.01 | 3.04 |

TABLE 29-continued

Percentage of milk protein

|  | Week 0 | Week 1 | Week 2 | Week 3 | Week 1 | Week 5 |
|---|---|---|---|---|---|---|
| Group O | 2.90 | 2.92 | 2.93 | 2.90 | 2.92 | 2.89 |

Means for 10 animals.
The values are expressed in %.

TABLE 30

Daily milk yield

|  | Week 0 | Week 1 | Week 2 | Week 3 | Week 4 | Week 5 |
|---|---|---|---|---|---|---|
| Group M | 19.3 | 22.8 | 23.9 | 28.2 | 28.5 | 28.5 |
| Group N | 19.4 | 20.5 | 20.6 | 21.0 | 21.2 | 22.1 |
| Group O | 19.4 | 19.3 | 19.4 | 19.5 | 19.3 | 18.9 |

Means for 10 animals.
The values are expressed in kg.

TABLE 31

Sensory test

|  | After 3 weeks | | | After 5 weeks | | |
|---|---|---|---|---|---|---|
|  | Flavor | Taste | Mouth feeling | Flavor | Taste | Mouth feeling |
| Group M | 4.7 | 5 | 4.7 | 5 | 5 | 5 |
| Group N | 4.0 | 4.0 | 4.3 | 4.3 | 4.3 | 4.0 |
| Group O | 2.3 | 2.7 | 2.3 | 2.3 | 2.3 | 2.7 |

Means for 15 panalists.
"Very good" scored 5; "Good," 4; "Average," 3; "Bad," 2; and "Very bad," 1.

As can be seen from Tables 26 to 30, the milk obtained from cows in Group M showed increased percentages of milk fat, solids-not-fat and milk protein, increased daily milk yield, and decreased cell counts, as compared with the milk obtained from cows in Groups N and O. Specifically, two weeks after the start of feeding, the percentages of milk fat, solids-not-fat, and milk protein in Group M exceeded 3.5%, 8.5%, and 3.0%, respectively, and it was found that the milk met the rank A qualification criteria. This indicates that (−)-epigallocatechin gallate of the present invention is effective in improving milk quality and milk yield. In addition, the results of the sensory test involving 15 panelists shown in Table 31 obviously indicate that the milk obtained from the cows in Group M are good in flavor, taste, and mouth feeling.

EXPERIMENTAL EXAMPLE 12

Thirty healthy cows that had just undergone parturition were divided into the following 3 groups of 10 cows each and fed for 1 year: Group P where 900 mg/day of (−)-epigallocatechin gallate prepared in Example 5 was given; Group Q where 900 mg/day of (+)-catechin prepared in Example 5 was given; and Group R where only ordinary feed was given. The above polyphenol compounds were mixed with an ordinary feed and given to the animals. As indexes for reproductive efficiency, the time required from parturition to conception, and the number of artificial inseminations attempted in a cow before pregnancy was confirmed were checked. The results are shown in Tables 32 and 33.

TABLE 32

Time required from parturition to conception

|  | Not more than 40 days | 40–60 days | 60–80 days | Not less than 100 days |
|---|---|---|---|---|
| Group P | 5 cows | 5 cows |  |  |
| Group Q | 2 cows | 2 cows | 3 cows | 3 cows |
| Group R |  | 2 cows | 3 cows | 5 cows |

TABLE 33

Number of artificial inseminations attempted before pregnancy was confirmed in a cow

|  | Once | Twice | Not less than 3 times |
|---|---|---|---|
| Group P | 9 cows | 1 cows |  |
| Group Q | 5 cows | 3 cows | 2 cows |
| Group R | 3 cows | 3 cows | 4 cows |

As obvious from Tables 32 and 33, it is found that the cows in Group P, as compared with the cows in Groups Q and R, required shorter time from parturition to the next conception and showed decreased number of artificial inseminations attempted in a cow before pregnancy was confirmed. This indicates that (−)-epigallocatechin gallate of the present invention effectively improves reproductive efficiency in the cows.

EXAMPLE 6

To 1 kg of tea leaves that were ground using a power mill and passed through a 1.5 mm diameter sieve, 10 L of water was added, and the mixture was heated at 90 to 95° C. for 30 minutes. The mixture was separated into a solid and a liquid to obtain 2.4 kg of moistened residue. The moistened residue was dried overnight at 70° C. and ground to obtain 700 g of tea leaf fiber. The contents of caffeine and polyphenols in this tea leaf fiber were low, being 0.6 g and 2.7 g per 100 g of the tea leaf fiber, respectively. It was almost free from astringency and bitterness, and therefore could suitably be added to feed for animals.

EXAMPLE 7

A mixture of green tea and oolong tea (3:1) in an amount of 200 g was ground to 2–3 mm in diameter and subjected to 2-hour extraction with 4 L of a mixture solution warmed at 50° C. of water, ethanol, and acetone (5:3:2 (v/v)). The mixture was separated into a solid and a liquid, and 320 g of the moistened residue obtained was dried by hot blow at 80° C. and ground to obtain 150 g of tea leaf fiber. The contents of caffeine and polyphenols in this tea leaf fiber were low, being 0.7 g and 3.5 g per 100 g of the tea leaf fiber, respectively. It was almost free from astringency and bitterness, and therefore could suitably be added to feed for animals.

EXAMPLE 8

Solid feed for pig breeding

| Ingredients | Mixing proportion (% by weight) |
|---|---|
| Skim milk | 32.6 |
| Wheat flour | 29.9 |
| Bread crumb | 7.0 |
| Non-fat soybean cake | 5.0 |
| Fish meal | 7.0 |
| Sugar | 4.0 |
| Glucose | 8.0 |
| Animal oils and fats | 2.0 |
| Oligosaccharide | 1.0 |
| Vitamins and minerals | 3.0 |
| Tea leaf fiber obtained in Example 6 | 0.5 |

The content of polyphenol compounds in the feed was 0.01%.

According to the above mixing proportions, feed for pig breeding was prepared by a conventional method.

EXAMPLE 9

| Feed for poultry farming | |
|---|---|
| Ingredients | Mixing proportion (% by weight) |
| Corn | 58.0 |
| Soybean cake | 15.9 |
| Fish meal | 6.0 |
| Wheat bran | 5.0 |
| Alfalfa | 3.0 |
| Calcium carbonate | 7.0 |
| Calcium phosphate | 1.6 |
| Salts | 0.4 |
| Vitamins and minerals | 0.1 |
| Soybean oil | 2.0 |
| Tea leaf fiber obtained in Example 7 | 1.0 |

The content of polyphenol compounds in the feed was 0.04%.

According to the above mixing proportions, feed for poultry farming was prepared by a conventional method.

EXAMPLE 10

| Feed for dairy cows | |
|---|---|
| Ingredients | Mixing proportion (% by weight) |
| Corn | 24.4 |
| Rye | 13.0 |
| Soybean cake | 21.5 |
| Rapeseed meal | 5.2 |
| Corn gluten feed | 8.0 |
| Wheat bran | 8.0 |
| Alfalfa | 1.0 |
| Cotton seed meal | 1.0 |
| Molasses | 3.5 |
| Calcium carbonate | 4.4 |
| Calcium secondary phosphate | 3.8 |
| Salt | 2.4 |
| Yeast | 0.4 |

-continued

Feed for dairy cows

| Ingredients | Mixing proportion (% by weight) |
|---|---|
| Vitamins and minerals | 2.4 |
| Tea leaf fiber obtained in Example 6 | 1.0 |

The content of polyphenol compounds in the feed was 0.03%.

According to the above mixing proportions, feed for dairy cows was prepared by a conventional method.

EXPERIMENTAL EXAMPLE 13

Twenty cows (mature) that were kept in an open livestock house were allocated to 2 areas. In one area, the animals took ad libitum the feed for dairy cows of Example 10; in the other area, the animals, as a control group, took the same feed except that the additive of the present invention was not contained. The feeding was started in the period when the milk yield began to decrease and continued for 60 days. After the completion of the experiment, the animals returned to usual feed.

TABLE 34

Effects on mike yield

|  | Study period | | | | |
|---|---|---|---|---|---|
|  | Before | Day 20 | Day 40 | Day 60 | 30 days after end of study |
| Control area | 100 | 91.3 | 79.7 | 65.4 | 41.2 |
| Study area | 98.7 | 101.3 | 96.4 | 87.2 | 64.3 |

The values are expressed by defining values of the control area before study as 100.

As shown in Table 34, the decrease in milk yield was effectively suppressed in the area where the additive of the present invention was given as compared with the control area, resulting in an increase of milk yield.

EXPERIMENTAL EXAMPLE 14

Two groups of twenty pigs (mature) each were separately kept in a pigsty and fed with the solid feed for pig breeding of Example 8 of the present invention and the control feed that is the same as the above feed except that the additive of the present invention was excluded, respectively for 6 weeks. The levels of ammonia in the pigsty were compared. The level of ammonia in each pigsty was measured at four sites at a height of 1 m from the floor using chemical detector tubes, and the mean value was obtained.

TABLE 35

Ammonia levels in pigsty

| | Ammonia levels in pig house (ppm) | |
|---|---|---|
| | Control area | Area fed with feed of Example 8 |
| Before study | 30.6 ± 8.2 | 29.5 ± 7.3 |
| Week 3 of study | 32.4 ± 3.9 | 22.0 ± 6.6 |

TABLE 35-continued

Ammonia levels in pigsty

| | Ammonia levels in pig house (ppm) | |
|---|---|---|
| | Control area | Area fed with feed of Example 8 |
| Week 6 of study | 33.1 ± 9.2 | 17.6 ± 5.7 |

As shown in Table 35, the ammonia level of the pigsty where the feed additive of the present invention was given to the animals was obviously decreased as compared with the control pigsty. The breeding environment was found to be improved.

EXPERIMENTAL EXAMPLE 15

Two groups of thirty piglets each were fed with the feed for pig breeding of Example 8 of the present invention and the control feed that is the same feed as the above except that the additive of the present invention was excluded, respectively for 20 days. The effect on breeding outcome was studied. The animals were allowed to have free access to the feed and water. The initial body weight, the body weight at the completion of the experiment, and feed intake were measured. From the means of each measurement, daily increments of body weight and feed demand rate were calculated to evaluate the breeding outcome.

TABLE 36

Effects on breeding outcome of piglets

| | Area of basic feed | Area of feed containing additive of the present invention |
|---|---|---|
| No. of test animals | 30 | 30 |
| Body weight at start (kg) | 10.2 | 10.4 |
| Body weight at complation (kg) | 21.7 | 23.8 |
| Body weight gain during study period (kg) | 11.5 | 13.4 |
| Daily body weight gain (g) | 575 | 670 |
| Feed intake (kg) | 19.7 | 20.2 |
| Feed demand rate | 1.71 | 1.51 |

Feed demand rate= Feed intake/Body weight gain during study period

As shown in Table 36, the piglets fed with the feed containing the additive of the present invention showed a higher daily increment of body weight and decreased feed demand, which indicates that the feed efficiency was improved.

EXPERIMENTAL EXAMPLE 16

After five cows were fed with the basic feed in Table 3 for 10 days as a preliminary feeding, the cows were fed with the feed for cows shown in Example 10 which contained the additive of the present invention, for 20 days. The animals were further fed with the basic feed for 10 days. The animals were allowed to have free access to the feed and water. With feces collected before the study, Days 10 and 20 of the study, and 10 days after the completion of the study, the rate of increase in bacterial count of Bifidobacterium; the rate of decrease in bacterial count of Clostridium; and pH were determined to evaluate the effect of improving intestinal function.

TABLE 37

Improvement of intestinal function

| | Study | | | |
|---|---|---|---|---|
| | Before | Day 10 | Day 20 | 10 days after end of study |
| Bifidobacterium | 100 | 109 | 137 | 102 |
| Clostridium | 100 | 83 | 61 | 92 |
| Fecal pH | 6.33 | 6.14 | 5.697 | 6.52 |

As for Bifidobacterium and Clostridium, the values before the study are defined as 100.

As shown in Table 37, when the feed containing the additive of the present invention was given, a decrease in pH of feces, an increase in beneficial Bifidobacterium, and a decrease in harmful Clostridium were observed, indicating an effect to improve intestinal function.

INDUSTRIAL APPLICABILITY

The present invention is significantly effective in inhibiting non-infectious and infectious diarrhea, and in improving quality and quantity of fresh milk and reproductive efficiency in domestic animals, poultry and pet animals, and therefore can make a great contribution to the livestock and pet industries.

Moreover, the tea leaf fiber of the present invention derives from the tea of daily beverage and presents high safety. By being given to cattle, it can promote intestinal function, decrease diarrheal occurrence, increase milk yield, improve feed efficiency, and alleviate malodor of feces and urine. Therefor, it is extremely useful in the livestock industry. Also, the production of feed additive according to the present invention can be put into practice combinedly with the production of tea polyphenol of which industrial importance has recently been established. It is also one of the features of the present invention that the productivity of each of the production methods can be increased by such combination.

We claim:

1. A method of increasing milk yield and improving milk quality in domestic animals, comprising:

feeding a therapeutically effective amount of (−)-epigallocatechin gallate to domestic animals in order to increase milk yield and to improve milk quality.

2. The method of claim 1, wherein said pharmaceutically effective amount is a daily dosage of (−)-epigallocatechin gallate of 0.03 to 5 mg/kg of body weight.

3. The method of claim 2, wherein said pharmaceutically effective amount is a daily dosage of (−)-epigallocatechin gallate of 0.1 to 3 mg/kg of body weight.

* * * * *